United States Patent
Gächter et al.

(10) Patent No.: US 6,984,837 B2
(45) Date of Patent: *Jan. 10, 2006

(54) OPTICAL TELEMETER TARGET ILLUMINATION APPARATUS WITH EDGE EMITTER LIGHT SOURCE

(75) Inventors: Bernhard Gächter, Balgach (CH); Andreas Schilling, Zug (CH); Laurent Stauffer, Widnau (CH); Urs Vokinger, Au (CH)

(73) Assignee: Leica Geosystems A.G., Heerbrugg (CH)

( * ) Notice: Subject to any disclaimer, the term of this patent is extended or adjusted under 35 U.S.C. 154(b) by 332 days.

This patent is subject to a terminal disclaimer.

(21) Appl. No.: 10/258,640

(22) PCT Filed: Oct. 17, 2001

(86) PCT No.: PCT/EP01/12009

§ 371 (c)(1),
(2), (4) Date: Mar. 10, 2003

(87) PCT Pub. No.: WO01/84077

PCT Pub. Date: Nov. 8, 2001

(65) Prior Publication Data

US 2003/0184727 A1    Oct. 2, 2003

(51) Int. Cl.
*H01L 31/14*    (2006.01)
(52) U.S. Cl. ............... 250/553; 356/4.01; 356/5.01
(58) Field of Classification Search ........... 250/216, 250/559.29, 559.38, 553; 356/4.01, 4.1, 356/5.01, 5.1
See application file for complete search history.

(56) References Cited

U.S. PATENT DOCUMENTS

| 4,820,010 A | * | 4/1989 | Scifres et al. ............... 385/43 |
| 6,441,889 B1 | * | 8/2002 | Patterson .................... 356/28 |
| 6,714,285 B2 | * | 3/2004 | Gachter et al. ............ 356/4.01 |

* cited by examiner

*Primary Examiner*—Thanh X. Luu
(74) *Attorney, Agent, or Firm*—Van Dyke, Gardner, Linn & Burkhart, LLP

(57) ABSTRACT

In order to improve target illumination, a light source (2) of an emitter, which has a laser diode (3) configured as an edge emitter with a wavelength of 1,550 nm, has beam forming optics (4) mounted downstream in relation thereto, which comprise a cylindrical lens (7) and a first deflection element (8) with three fields having different diffraction structures. Said deflection element are located next to one another and crosswise in relation to the first fields and which also have different diffraction structures. Said deflection element directs the partial beams to the aperture of a collimator (1) in such a way that the partial beams substantially fill said aperture. The first deflection element (8) and a mount (6) for the cylindrical lens (7) are integral and, alike the second deflection element (10), are made of plastic. Both parts are glued to opposite sides of the frontal areas of a block (5) made of glass.

19 Claims, 1 Drawing Sheet

OPTICAL TELEMETER TARGET ILLUMINATION APPARATUS WITH EDGE EMITTER LIGHT SOURCE

TECHNICAL FIELD

The invention relates to an optical telemeter such as employed for instance in the surveying of plots of land and buildings.

PRIOR ART

Optical telemeters of this kind have been known for some time already. The laser diodes used as light sources have the disadvantage, however, that the light beam exiting at the emission edge has a very long and narrow cross section. This leads to poor target illumination, since only part of the light beam strikes the target thus detracting from the range and from measuring accuracy. Moreover, reflection of parts of the beam missing the target at other objects, which for instance are more distant, may acutely disturb the measurements.

DESCRIPTION OF THE INVENTION

The invention is based on the task to specify an optical telemeter of the above kind providing a better target illumination than known telemeters of this kind.

The advantages attained by the invention chiefly reside in a decisive improvement of range, i.e., the maximum distance that can be measured or, for a given range, in an increased measuring accuracy.

BRIEF DESCRIPTION OF THE DRAWINGS

In the following, the invention is described in greater detail with the aid of figures representing merely one embodiment.

FIG. 1b schematically shows a top view of the emitter according to FIG. 1a,

WAYS TO PRACTICE THE INVENTION

Figure 1A:
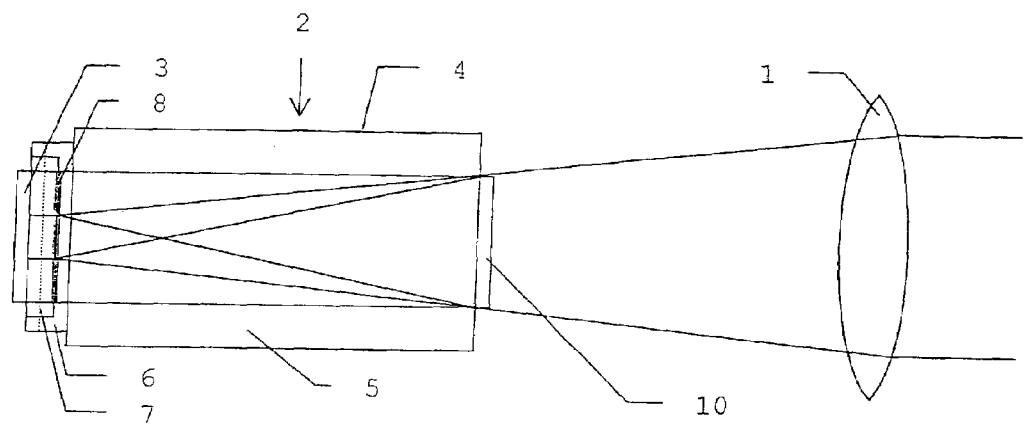
FIG. 1a schematically shows a lateral view of an emitter of a telemeter according to the invention.
Figure 1B:
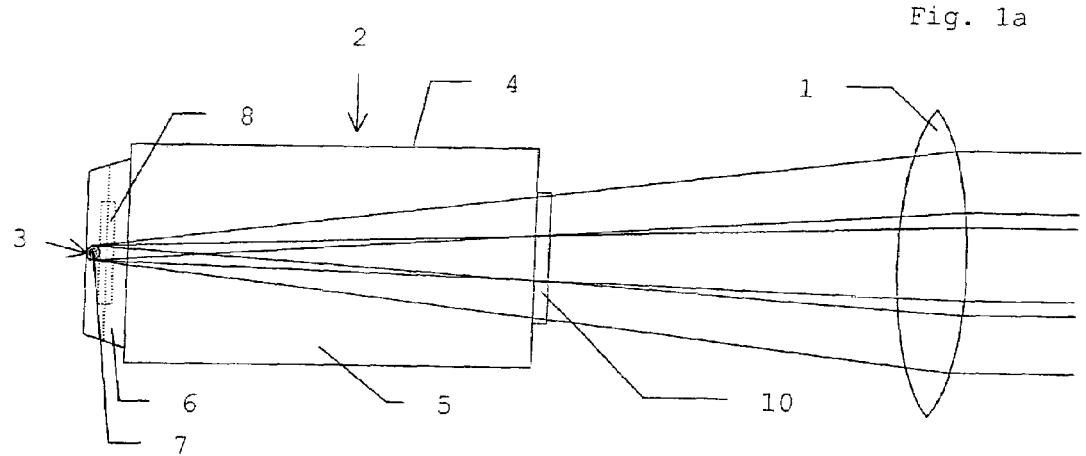

An optical telemeter according to the invention comprises an emitter as well as a receiver that, in known manner, can for instance be built up with optics and avalanche photodiodes, and further comprises an electronic control and evaluating unit also of known design controlling the emission of light pulses by the emitter and evaluating the output signal of the receiver. The distance can be measured by transit-time determination or by the phase-matching technique.

The emitter has a collimator 1 and a light source 2 put in front of it which is composed of a laser diode 3 and beam forming optics 4. The laser diode 3 is an edge emitter emitting electromagnetic waves in the infrared, preferably at a wavelength between 850 nm and 980 nm or a wavelength $\lambda=1,550$ nm. The emission edge has a length between 30 $\mu$m and 800 $\mu$m while its width is between 1 $\mu$m and 3 $\mu$m. The emission edge may be interrupted in its longitudinal direction. For instance, instead of one laser diode 3 a linear array of laser diodes having edge lengths of for instance 50 $\mu$m and distances between successive edges of 100 $\mu$m could be provided. The numerical aperture corresponding to the sine of half the angular aperture has a value of 0.1 parallel to the emission edge and of 0.6 to 0.7 transverse to this edge. The product of these two quantities, known as space bandwidth product (SBP), in a direction transverse to the emission edge approximately corresponds to the wavelength, and thus is practically monomodal (transverse mode of 0), i.e., it is close to a fundamental limiting value that cannot be exceeded, while parallel to the emission edge it is larger than this limiting value by a factor of 10 to 100. Even in this direction the SBP cannot be altered by conventional refracting elements such as lenses, but with the aid of elements based on diffraction or refraction of light, it can be lowered very close to the emission edge by rearrangement in a direction parallel to the emission edge but instead be enhanced in a direction transverse to this edge, and thus the light beam can be more strongly collimated.

This is the purpose of the beam forming optics 4 comprising a parallelepipedal block 5 consisting of a transparent material, preferably glass, with a first front face turned toward the laser diode 3 and an opposite second front face turned toward the collimator 1. The first front face supports a mount 6 of plastic holding a cylindrical lens 7 at its terminal zones. The cylindrical lens 7 has a circular cross section, its diameter is about 60 $\mu$m. It is oriented parallel to the emission edge of laser diode 3 and spaced apart from this diode by about 10 $\mu$m. The beam exiting from the emission edge which for laser diodes of the kind employed has a large transverse radiation angle of about 80° is made parallel by it. The diameter of the cylindrical lens and its distance from the emission edge may also be much larger than the given values, but for small values, particularly for values of at most 65 $\mu$m and at most 15 $\mu$m, respectively, the overlap of the fractions coherently radiated from successive regions of the edge is very small so that the losses caused by this overlap are also kept low.

Downstream of the cylindrical lens 7 a first deflection element 8 is arranged which is integral with the mount 6 and has a structured surface that is essentially plane and parallel to the first front face of block 5. Parallel to the emission edge it is divided into three successive fields 9a, b, c having different stepped diffraction structures. The second, opposite front face of block 5 supports a second deflection element 10 consisting of plastic and comprising a structured surface essentially plane and parallel to the second front face that is divided into three successive fields 11a, b, c transverse to the emission edge also having different stepped diffraction structures.

The upper field 9a of the first deflection element 8 has a structure such that it deflects the partial beam exiting from an upper segment of the emission edge and striking it to the left-hand field 11a (looking in beam direction) of the second deflection element 10 where the beam is insignificantly deflected so that it will strike the collimator 1 and approximately fill the left-hand third of the collimator's aperture. In exactly corresponding manner, the lower field 9c of the first deflection element 8 deflects the partial beam exiting from a lower segment of the emission edge and striking it, to the right-hand field 11c (looking in beam direction) of the second deflection element 10, where this beam, too, is deflected precisely in the corresponding way and then fills approximately the right-hand third of the aperture of collimator 1. The central third of the collimator is filled by the partial beam exiting from a slightly shorter central segment of the emission edge and passing without deflection through the unstructured central fields 9b and 11b of the first deflection element 8 and second deflection element 10, respectively.

Thus, the three partial beams are so deflected in different ways by the first deflection element 8 that they strike the second deflection element 10 side by side (when looking in a direction transverse to the emission edge), hence their projections onto a plane, e.g. formed by the directions of the emission edge and of the beam, essentially coincide.

However, a deflection can also be done in such a way that the projections essentially falls onto a plane which is inclined with respect to the plane formed by the directions of the emission edge and of the beam. A relevant task is to avoid a cross-over of the partial beams. According to the inventive concept it is possible to functionally integrate the deflection into the first deflection element 8 by means of design or to cause the deflection by additional elements which can be attached also to the first deflection element 8.

Figures 3, 4, 5:
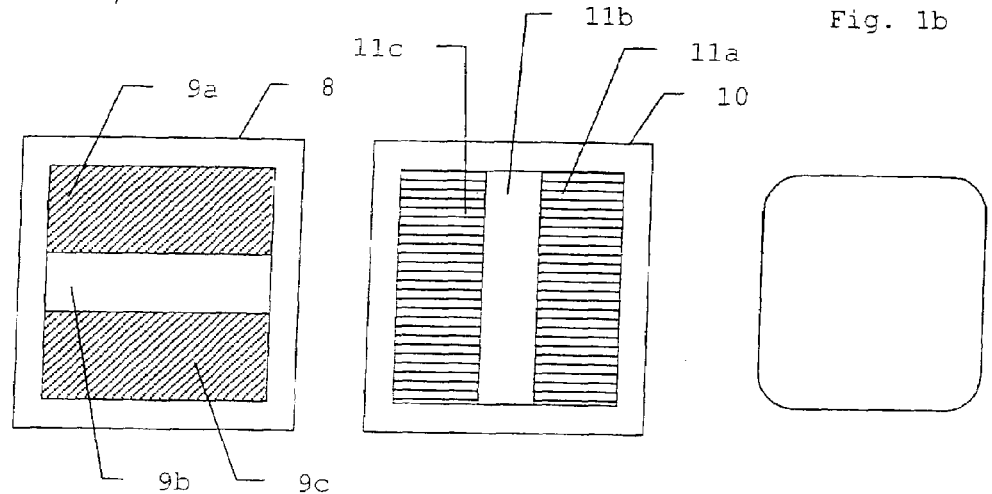
FIG. 3 shows a top view in beam direction of a first deflection element of the emitter according to FIGS. 1a, b.
FIG. 4 shows a top view counter to the beam direction of a second deflection element of the emitter according to FIGS. 1a, b.
FIG. 5 shows the target illumination attained by the emitter according to FIGS. 1a, b.

In the second deflection element 10 the partial beams are then so deflected in different ways that they strike the collimator 1 as if they all came from a line parallel or inclined to the emission edge in the focal plane of collimator 1 or, stated differently, in such a way that their back extrapolation will lead to such a line, and that each partial beam fills approximately one third of the aperture of collimator 1. The three successive segments of the emission edge are imaged onto a nearly square field, and indeed in such a way that they are superimposed in the far field (FIG. 5). This secures an excellent target illumination.

At wavelengths between 850 nm and 950 nm the beam can be collimated very strongly, allowing a range scan with high lateral resolution. Wavelengths around 1,550 nm are also very advantageous, since then the upper limit of the admissible single-pulse energy which is defined in terms of safety to the eyes has a value of about 8 mJ and thus is higher by a factor of about 16,000 than at wavelengths between 630 and 980 nm. By employing this factor at least in part, which becomes possible because of better beam concentration according to the invention, one can very substantially increase the range or, for a given range, raise the sensitivity.

The mount 6 and the first deflection element 8 that is integral with it, as well as the second deflection element 10, each are produced by one of the replication techniques as described in M. T. Gale, 'Replication', in H. P. Herzig (editor), 'Micro-Optics', Taylor & Francis 1997, pp. 153–177, for instance by etching of a cylinder or piston of quartz and by hot embossing, injection molding, or casting followed by UV curing, and are then bonded to block 5. The definition of the diffraction structures can be performed with known computer programs. The replication technique allows large numbers of parts to be fabricated at favorable cost. Since the mount 6 is also made by this technique, a very precise positioning of cylindrical lens 7 is possible. The tolerated variation of distance between the lens and the first deflection element 8 is a few micrometers. Using soldering and active adjustment as described in DE-A-197 51 352, the laser diode 3 can then be bonded in such a way to the beam forming optics 4 that the tolerated variation of mounting between it and the cylindrical lens 7 is about 0.5 $\mu$m.

Various modifications of the embodiment described are possible. Thus, the cylindrical lens may be fastened with cement directly to the laser diode. The first deflection element and the second deflection element may also consist of glass, and for instance be made by an etching process. They may also be etched directly into the block separating them. The number of fields in the deflection elements may be two, four or more, instead of three. The beam forming optics may consist of refracting elements, for instance prisms and plates.

Finally, laser diodes having wavelengths particularly between 600 nm and 1,000 nm, and more particularly between 630 nm and 980 nm which are outside the regions indicated above can be employed.

LIST OF REFERENCE SYMBOLS

1 Collimator
2 Light source
3 Laser diode
4 Beam forming optics
5 Block
6 Mount
7 Cylindrical lens
8 first deflection element
9a,b,c Fields
10 second deflection element
11a,b,c Fields

The invention claimed is:

1. Optical telemeter target illumination apparatus comprising at least one light source for target illumination and a collimator collimating the radiation to be emitted by said light source prior to target illumination, said light source being arranged in front of said collimator, said light source comprising at least one laser diode having an emission edge, said emission edge including successive segments, said light source shaving beam forming optics mounted downstream of said at least one laser diode and at least approximately illuminating said collimator, said light source generating offset partial beams, wherein said offset partial beams are emitted from the successive segments of the emission edge of the at least one laser diode, the offset partial beams being parallel to the emission edge in such a way that the offset partial beams substantially overlap, said beam forming optics comprising a first deflection element based on diffraction or refraction of light, and a second deflection element based on diffraction or refraction of light, each of said first and second deflection elements having an essentially plane surface and divided into at least two fields.

2. Optical telemeter target illumination apparatus according to claim 1 wherein said at least one laser diode emits with a wavelength between 850 nm and 980 nm.

3. Optical telemeter target illumination apparatus according to claim 1 wherein said at least one laser diode emits with a wavelength of approximately 1,550 nm.

4. Optical telemeter target illumination apparatus according to claim 1 wherein said beam forming optics comprise a cylindrical lens immediately following after said at least one laser diode, said cylindrical lens having an axis that is parallel to the emission edge of said at least one laser diode.

5. Optical telemeter target illumination apparatus according to claim 4 wherein the diameter of said cylindrical lens is less than or equal to 65 $\mu$m.

6. Optical telemeter target illumination apparatus according to claim 4 wherein the distance between the emission edge and said cylindrical lens is less than or equal to 15 $\mu$m.

7. Optical telemeter target illumination apparatus according to claim 1 wherein said first deflection element deflects the partial beams in different ways in a direction transverse to the emission edge and also in a direction parallel to the emission edge wherein the partial beams strike the second deflection element essentially side by side and the second deflection element orients the partial beams in such a way as if the partial beams all issued from a line in a focal plane of the collimator.

8. Optical telemeter target illumination apparatus according to claim 7 wherein the fields of each of said first and second deflection elements are oriented parallel to the emission edge and contain different diffraction structures, and wherein the number of fields of the second deflection element correspond to the number of fields of said first deflection element, the fields of the second deflection element containing different diffraction structures.

9. Optical telemeter target illumination apparatus according to claim 7 wherein said beam forming optics comprise a block of transparent material with a first front face to which said first deflection element is fastened and an opposite second front face to which said second deflection element is fastened.

10. Optical telemeter target illumination apparatus according to claim 7 wherein said first deflection element and the said second deflection element are generally made of a plastic.

11. Optical telemeter target illumination apparatus according to claim 9 wherein said cylindrical lens is tied to a mount fastened to the first front face of said block.

12. Optical telemeter target illumination apparatus according to claim 11 wherein said first deflection element is integral with said mount.

13. Optical telemeter target illumination apparatus according to claim 11 wherein said at least one laser diode is fastened by soldering to said block.

14. Optical telemeter target illumination apparatus according to claim 4 wherein said cylindrical lens is fastened to said at least one laser diode with cement.

15. Optical telemeter target illumination apparatus according to claim 1 wherein said beam forming optics is designed in such a way that the partial beams will be superimposed in a far field.

16. Optical telemeter target illumination apparatus according to claim 1 wherein said beam forming optics is designed in such a way that the partial beams in the far field are imaged onto a nearly square field.

17. Optical telemeter target illumination apparatus according to claim 1 wherein the emission edge and the beam direction define a plane.

18. Optical telemeter target illumination apparatus according to claim 17 wherein said first deflection element deflects the partial beams in different ways in a direction transverse to the emission edge and also in a direction parallel to the emission edge, wherein the partial beams strike the second deflection element essentially side by side and the second deflection element orients the partial beams with respect to the collimator.

19. Optical telemeter target illumination according to claim 17 wherein said first deflection element deflects the partial beams in different ways in a direction transverse to the emission edge and also in a direction parallel to the emission edge wherein the partial beams strike the second deflection element essentially side by side and the second deflection element orients the partial beams with respect to the collimator and wherein the fields of said first deflection element are oriented parallel to the emission edge and contain different diffraction structures, and that the number of fields of the second deflection element correspond to the number of fields of said first deflection element, the fields of the second deflection element containing different diffraction structures.

* * * * *

UNITED STATES PATENT AND TRADEMARK OFFICE
CERTIFICATE OF CORRECTION

PATENT NO. : 6,984,837 B2  Page 1 of 1
APPLICATION NO. : 10/258640
DATED : January 10, 2006
INVENTOR(S) : Bernhard Gächter et al.

It is certified that error appears in the above-identified patent and that said Letters Patent is hereby corrected as shown below:

<u>Column 4:</u>
Line 33, Claim 1, "shaving" should be --having--.

<u>Column 6:</u>
Line 20, Claim 19, Insert --apparatus-- after "illumination".

Signed and Sealed this

Sixth Day of February, 2007

JON W. DUDAS
*Director of the United States Patent and Trademark Office*